(No Model.)

G. O. SPENCER.
ROAD SNOW PLOW.

No. 569,249. Patented Oct. 13, 1896.

Witnesses
N. J. Jenkins
Henry E. Burnham

Inventor
George O. Spencer
By his Attorney
J. B. Thurston

THE NORRIS PETERS CO., PHOTO-LITHO., WASHINGTON, D. C.

UNITED STATES PATENT OFFICE.

GEORGE O. SPENCER, OF MANCHESTER, NEW HAMPSHIRE.

ROAD SNOW-PLOW.

SPECIFICATION forming part of Letters Patent No. 569,249, dated October 13, 1896.

Application filed May 7, 1896. Serial No. 590,527. (No model.)

*To all whom it may concern:*

Be it known that I, GEORGE O. SPENCER, a citizen of the United States, residing at Manchester, in the county of Hillsborough and State of New Hampshire, have invented certain new and useful Improvements in Road Snow-Plows; and I do hereby declare the following to be a full, clear, and exact description of the invention, such as will enable others skilled in the art to which it appertains to make and use the same.

This invention relates to devices for clearing out drifts and deep snow from country roads, the object being to provide a device which farmers and others in charge of highways can readily apply to an ordinary two-horse sled.

The invention consists of a suitable frame, adapted for application to an ordinary sled, provided with one or more windlasses connected by ropes or cables to adjustable plows or scrapers arranged substantially as set forth in the following specification and claims, and clearly illustrated in the accompanying drawings, forming a part of same, of which—

Figure 1:
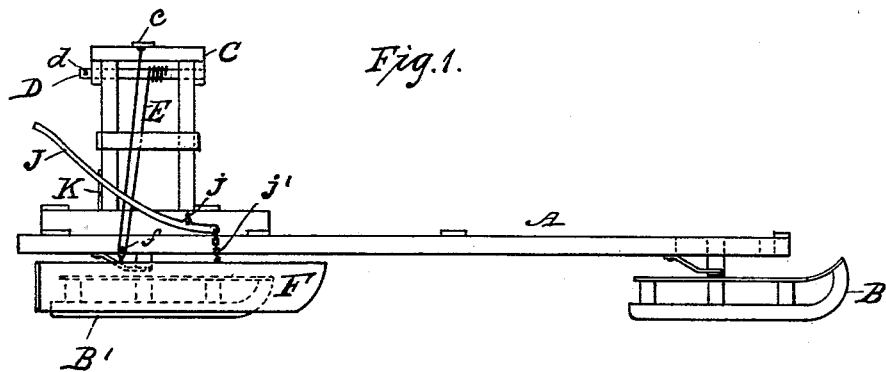
Figure 2:
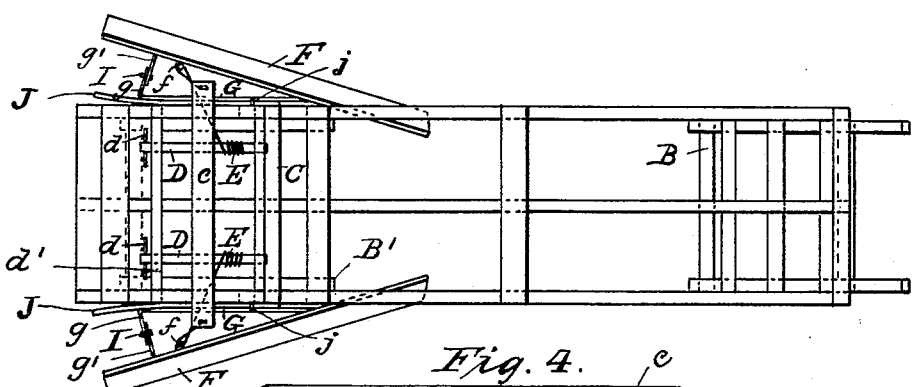
Figure 4:
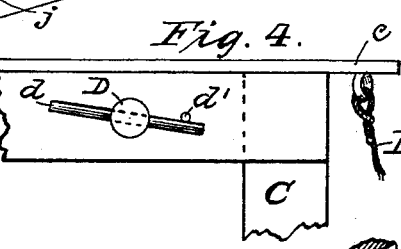
Figure 3:
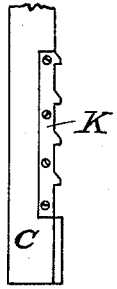
Figure 5:
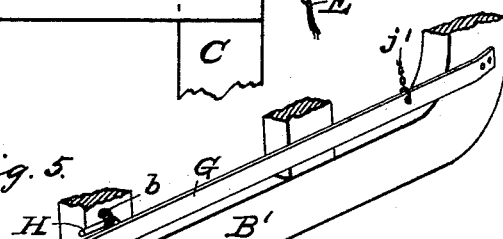

Figure 1 is a side elevation of an ordinary sled provided with my improvements, Fig. 2 being a general plan of same. Fig. 3 shows a portion of the windlass-frame to which a serrated metal plate is attached for adjusting the lever that raises the forward part of either plow or scraper. Fig. 4 represents a portion of the rear of the windlass-frame and shows means for maintaining either of the adjustable scrapers at a desired elevation. Fig. 5 is a detailed perspective view showing an iron bar which connects either plow or scraper with the sled, and a portion of one of the rear runners in proper relative position.

Similar reference-letters denote corresponding parts in all the views.

The sled-frame A is supplied with front and rear runners B B', and over the rear runners is secured my improved windlass-frame C, provided near its top with a pair of windlasses D, which carry a rope or cable E, said rope or cable passing through a pulley-block $f$, secured one to each of the plows or scrapers F, one end of each rope or cable being secured to one of the winding-drums or windlasses and the other end being attached to a board $c$ of the frame C, as in Figs. 1 and 2.

The drums or windlasses D may have one or more spokes or handles $d$ projecting radially from their rear ends, and pins $d'$ may be placed in a perforation formed for the purpose in the frame C, so as to form contact with the handles $d$ and prevent their rotation when the scrapers have been elevated to the height desired.

Iron bars G, the rear ends of which are bent at an angle, as at $g$, are provided on the side adjacent to the runners with a hook H, arranged horizontally and adapted to engage an eye $b$, secured to each of the rear runners B'. The forward ends of said bars G are secured to the inner side of the forward part of either scraper F, the rear portions of said scrapers being provided with a laterally-projecting bar $g'$, which may be adjustably connected to the bent end $g$ of said bar G, each being provided with two elongated openings $g^2$, one of said openings being adapted to receive a threaded bolt I, passing through each of said bars $g'$ and one of the openings in said bent portions $g$ of the bars G, and the other being adapted to receive a pin $g^3$, rigidly secured at the proper point in each of the said laterally-projecting bars $g'$, by which the portions $g$ of the bar G and the bars $g'$ are maintained in a position parallel one with the other.

The forward ends of the scrapers may be raised or lowered by means of levers J, placed one at each side of and pivoted at J to the frame C, said levers being connected to the scrapers by a suitable bar or chain $j'$, and at each side of the rear of said frame C is provided a serrated plate K, against which said levers bear, and for the purpose of adjusting said levers the latter may be sprung outward sufficiently to disengage either of the serrations on the edge of said plate K, and thus the forward end of the scrapers may be easily retained at any desired elevation, while the windlasses and ropes or cables perform a similar service with respect to the rear end of said scrapers.

The width of the course to be plowed is determined by adjusting the bent portions $g$ of the bars G and the bars $g'$ and fastening them at any point desired by means of the bolt I, as shown.

Having described my invention, what I claim is—

1. In a snow-plow for highways, a plow or scraper hung at each side of an ordinary sled, a suitable frame adapted to rest upon said sled provided with a windlass and a rope or cable in connection with each of said scrapers, each being provided with a bar placed at an angle therewith the forward end of which is attached to the forward end of the scraper and the rear end bent at an angle and provided with an extensible connection which is attached to the rear portion of the scraper, and for maintaining either end of said scrapers at the desired elevation, all substantially for the purpose set forth.

2. In a snow-plow for highways, a frame adapted for attachment to an ordinary sled, a plow or scraper consisting of planks hung one at each side of and at an angle with the runners of said sled, a pulley-block attached near the rear end of each scraper, a rope or cable having one end secured to the top of said frame and the other wound around a windlass mounted in said frame, the said windlass, and means for adjusting the forward ends of said scrapers substantially for the purpose set forth.

In testimony whereof I affix my signature in presence of two witnesses.

GEORGE O. SPENCER.

Witnesses:
J. B. THURSTON,
JOHN H. ANDREWS.